Oct. 19, 1943.  F. R. HENSEL ET AL  2,331,909
GEAR AND THE LIKE
Filed Dec. 4, 1940
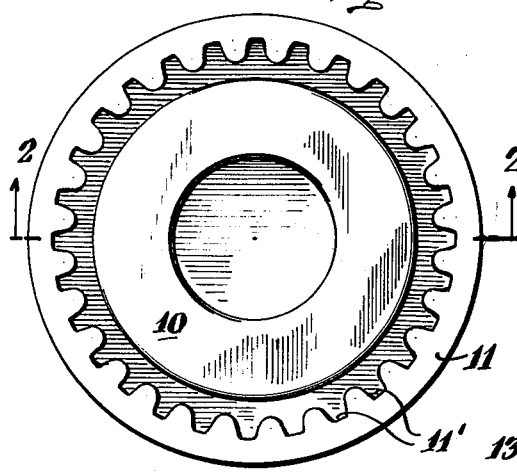
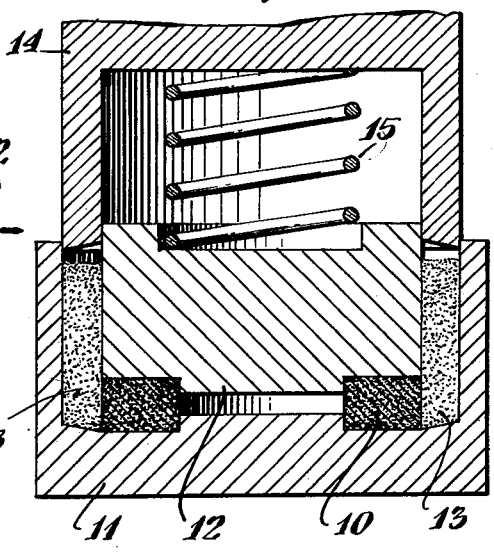
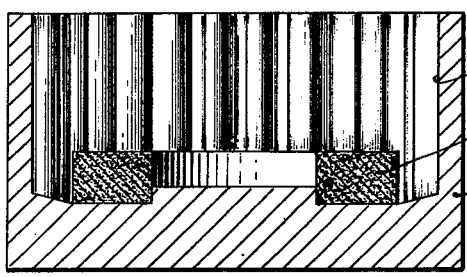
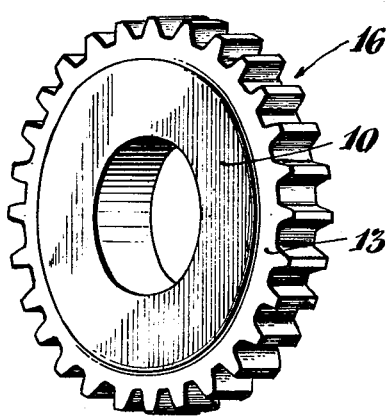
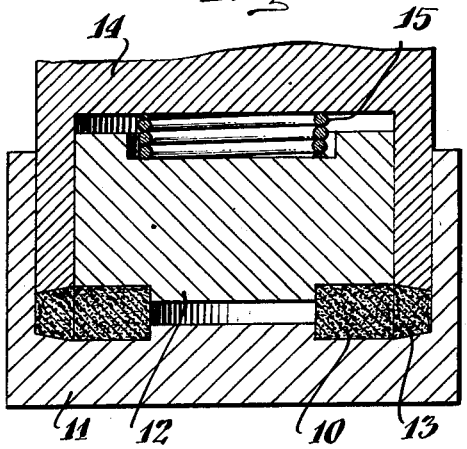
INVENTORS
Franz R. Hensel
BY Carl I. Larsen
ATTORNEY Patented Oct. 19, 1943

2,331,909

UNITED STATES PATENT OFFICE 2,331,909

GEAR AND THE LIKE

Franz R. Hensel and Earl I. Larsen, Indianapolis, Ind., assignors to P. R. Mallory & Co., Inc., Indianapolis, Ind., a corporation of Delaware Application December 4, 1940, Serial No. 368,442

3 Claims. (Cl. 74—460)

This invention relates to toothed parts such as gears, sprocket wheels and racks, and more particularly to toothed parts made from powdered metals.

It is an object of the invention to produce toothed parts such as gears, sprocket wheels and racks from powdered metals which have improved physical properties imparted by an age-hardening treatment.

It is a further object of the invention to produce gears from powdered metals, which use an intermetallic compound for age-hardening.

It is still a further object of the invention to produce gears which have increased hardness, toughness, combined with fine grain size and increased wear resistance.

Other objects of the invention will be apparent from the following description taken in connection with the appended claims.

The present invention comprises the combination of elements, methods of manufacture and the product thereof, brought out and exemplified in the disclosure hereinafter set forth, the scope of the invention being indicated in the appended claims.

While a preferred embodiment of the invention is described herein, it is contemplated that considerable variation may be made in the method of procedure and the combination of elements, without departing from the spirit of the invention.

In the drawing:

Figure 1 is a top view of a gear mold having a pre-pressed core inserted therein;

Figure 2 is a section on the line 2—2 of Figure 1.

Figures 3 and 4 illustrate the pressing of the gear from metal powder; and

Figure 5 shows the completed gear.

This invention contemplates the manufacture of toothed parts such as gears, sprocket wheels and racks from metal powders, involving some or all of the steps of mixing the powders, compressing them in special dies and presses, such dies being either of the solid or collapsible expansion type, sintering the compressed gears at a predetermined temperature and subsequently applying a heat treatment to such gears, which will cause complete diffusion of the alloyed ingredients into the matrix at a high homogenizing temperature, rapidly cooling such gears, sprocket wheels and racks, after they have been heated to the high temperature and subsequently subjecting same to a heat treatment, at a lower temperature, which will cause precipitation of the added elements in the form of intermetallic compounds or solid solutions, which precipitation greatly increases the hardness, wear resistance and tensile strength of the molded products.

Gears, sprocket wheels and racks covered by the present invention, may be composed of ingredients of approximately the following proportions:

| | Per cent |
|---|---|
| One or more of the elements chromium, cobalt and nickel | .25–10 |
| One or more of the elements beryllium and silicon | .05– 5 |
| Balance substantially all copper. | |

The invention contemplates the use of the following intermetallic compounds for age hardening the copper base alloys:

Chromium, cobalt and nickel silicide.
Chromium, cobalt and nickel beryllide.

The intermetallic compounds should preferably comprise .5 to 10% of the sintered and heat treated powder composition, it being permissible in some instances to have an excess of one or the other of the base or acid-forming elements also present.

The invention also contemplates pre-alloying the elements forming the inter-metallic compound in the correct proportion and then reducing the alloy to powder of the correct mesh. In some cases it is possible to produce alloy powders directly in the correct proportions. It is therefore contemplated that in the present invention the ingredients chromium, nicked and/or cobalt, combined with silicon and/or beryllium, are added in the form of alloy powders of the following compositions:

| | Per cent |
|---|---|
| Beryllium and/or silicon | 10 to 40 |
| Chromium, cobalt and/or nickel | 90 to 60 |

As a specific example, in using alloy powders containing 80% cobalt and 20% beryllium, a powder mixture is prepared, using 97% copper powder and 3% of this cobalt-beryllium alloy powder, the particle size of which is between 150 and 400 mesh.

Experiments show that by using the finest possible powder, such as 325 mesh, of the cobalt-beryllium alloy, the most rapid rate of diffusion of the alloy powder with the copper is experienced. After thoroughly ball milling the powders, pressure is applied in order to compact the metal powders.

It is found that the density depends upon the pressure. For instance, at 20 tons per square inch pressure, a density of 6.41 grams per cubic centimeter was obtained, which after sintering, increased to 7.20 grams per c. c. With a pressure of 40 tons p. s. i., the density before sintering was 7.36 grams per c. c., which increased to 8.10 grams per c. c., after sintering. The sintering is carried out in a reducing atmosphere for one hour at 975 deg. C. Experiments were carried out, re-pressing the material at 85 tons p. s. i. and re-heating same in a reducing atmosphere for one hour at 975 deg. C., from which temperature the parts were quenched in water. Subsequent to the quenching, an aging treatment was applied, such as aging for 10 hours at 425 deg. C. The resulting products had a Rockwell B hardness of 90–96, a tensile strength of 90,000–92,000 p. s. i. The final density of the material varied from 8.3–8.5 and the thermal conductivity was 40–45% that of pure annealed copper.

Using intermetallic compounds of nickel and beryllium as an age hardening ingredient similar properties are obtained, using a nickel content varying from 1 to 2% and a beryllium content from .2 to .5%. The nickel-beryllium alloy is introduced in the form of a pre-alloyed nickel-beryllium powder.

Great advantages can be gained by introducing the intermetallic compounds in the correct proportions in the form of pre-alloyed powders because the temperatures and conditions required for causing the alloying of beryllium with nickel and/or cobalt, are different from the conditions required for diffusing the elements with copper. It is particularly difficult to prevent the oxidation of beryllium, due to impure hydrogen or any other oxidizing medium contained in a reducing atmosphere, or in an imperfect vacuum. The difficulties of loss of beryllium are greatly reduced by the use of the pre-alloyed powder.

Tests have been made with intermetallic compounds having as their base, nickel and cobalt, but using silicon instead of beryllium. Again, the same advantages were found with pre-alloyed powders as in the case of the beryllium containing compounds.

Tests have also been conducted which indicated that a mixture of the compounds such as cobalt and/or nickel beryllide and cobalt and/or nickel silicide can be used in order to arrive at a molded product having high strength values combined with high thermal conductivities.

The inventors have conducted a large number of tests with other age-hardened copper alloys, and they have been able to obtain strength values up to a maximum of 40,000–50,000 p. s. i. By using the methods described in the present invention and by using the age hardening compounds in the form of pre-alloyed powders of extreme fineness, they have been able to obtain double the strength values in the neighborhood of 80,000 to 100,000 p. s. i. With powder metallurgy, this increase in strength is quite unexpected and remarkable.

In some cases, the composition may also contain a small amount of manganese. In a pressed powder article having 3% nickel-silicide and .02% manganese, an ultimate strength was obtained of 49,000 p. s. i. Using the same percentage of nickel-silicide, but .07% manganese, the tensile strength was 54,500 p. s. i. By further increasing the manganese content to .12% the ultimate strength was 56,000 p. s. i. In all three cases the elongation was zero.

The copper-nickel-silicide alloys were made by using the powders of the metals themselves, that is, nickel powder, silicon powder and manganese powder. In other words, we did not pre-alloy nickel and silicon to form the correct intermetallic compound. While this is possible with nickel and silicon, it can not be done with nickel and beryllium, cobalt and beryllium, chromium and beryllium. The ratios of beryllium to chromium, beryllium to cobalt, and beryllium to nickel are preferably one to six in each case. The ratio of silicon to chromium is also preferably one to six. However, the ratios of silicon to cobalt and silicon to nickel are one to four preferably.

Since cobalt is an age hardening ingredient by itself, an excess of it would be quite harmless, because this excess is precipitated during the heat treatment and, therefore, the electrical and mechanical properties are not impaired. In the case of chromium, an excess of chromium is also quite harmless because chromium by itself will be precipitated during heat treatment. It is important, however, in case of chromium that no excess of either silicon or beryllium is present, since otherwise the susceptibility to heat treatment is impaired and the physical and electrical properties are lower.

In the case of cobalt-beryllium an excess of beryllium does not seem to be harmful. As a matter of fact, we have made samples where the ratio of beryllium to cobalt was one to two and both physical and electrical properties were satisfactory.

The present invention makes possible the fabrication or production of gears, sprocket wheels or racks, in a very economical manner. For example, when gears are machined from forgings or castings, it is necessary to cut the teeth by some mechanical means. This operation in many cases is very costly, time consuming and requires special machines.

In practicing our present invention, we have found it possible to eliminate all or nearly all of the machining operations. According to the present invention, it is possible to press or mold the teeth directly into the gear, sprocket wheel or rack, while the part is being formed. This also makes possible a saving of the raw materials that go into the gear, sprocket wheel or rack. Articles made according to the present invention require only a small amount and, in certain cases, no finish machining. If a gear is required which must be finished to very accurate tolerances, then it may be necessary to perform only a lapping or grinding operation and in many cases, a coining operation may be applied, to produce an article of very close dimensional tolerances.

The invention also contemplated pressing a plain core first and then in a second operation, inserting the pre-pressed core into a mold, filling powder around it, and pressing it to form a single structure. This core may be of a different composition than the powder mixture of the outside contour. In many cases, it may be desirable to have materials of different physical properties, such as a very hard surface and a tough core. The core may also be formed from cast, drawn on forged metal in some cases.

By means of molding of these parts, such a combination of different compositions, giving different physical properties, can be readily accomplished. It is contemplated, therefore, to use an alloy as described above, for the surface and a softer and tougher copper alloy, such as an ordinary bronze or brass or beryllium bronze for the core. By using copper base alloys both for the core and the contour, the same coefficient of expansion is retained in each part and therefore no internal stresses are set up during the manufacture of such a product.

Referring to the drawing, which illustrates a method of forming a gear having a preformed core of the type described, the core 10 is placed in a suitable die 11 of larger diameter than the core having suitable gear-tooth recesses 11' around its hollow periphery, as shown in Figures 1 and 2. An inner die member 12 may then be inserted over the core leaving a filling space between itself and the wall of die 11 having the gear-tooth recesses. This space is filled with the necessary quantity of the copper powder composition 13 described and a co-operating pressure-applying die 14 is pressed down on the powder 13 as shown in Figure 3, a spring 15 holding die member 12 in position.

The pressure is increased until the powder is highly compacted between the outer periphery of core 10 and the gear-tooth recesses as shown in Figure 4. The pressure is then removed after which the pressed gear member can be removed and subjected to sintering and further heat treatment resulting in the gear member 16 shown in Figure 5.

The compositions of the present invention may be modified in such a way that the ingredients are incorporated into the powder mixture which have lubricating properties. Such ingredients may be graphite or lead or other soft low melting point metals and alloys, such as zinc, cadmium, tin and thallium.

It is also possible to produce compositions as covered by the present invention, where a predetermined density of the material is obtained, after sintering, by applying a predetermined amount of pressure in pressing articles, resulting in a material having a predetermined amount of porosity and voids, which can be impregnated with a lubricant such as lubricating oils and greases, or lubricating compounds in general.

While the present invention as to its objects and advantages has been described herein as carried out in specific embodiments thereof, it is not desired to be limited thereby, but it is intended to cover the invention broadly, within the spirit and scope of the appended claims.

What is claimed is:

1. A toothed member comprising a core of a tough copper alloy and a toothed surface integrally bonded thereto, said surface being formed of a compact bonded mass of copper alloy powders containing precipitation-hardening intermetallic compounds therein in a disperse phase imparting thereto greater hardness than said core.

2. A toothed member comprising a core of tough copper alloy and a toothed surface sintered thereto, said surface being formed of a compact bonded mass of copper alloy powders, composed of 0.25 to 10% of a base-forming element selected from the group consisting of chromium, cobalt and nickel and 0.05 to 5% of an acid-forming element selected from the group consisting of silicon and beryllium, balance substantially all copper, at least part of said base-forming and acid-forming elements being combined to form intermetallic compounds.

3. A toothed member comprising a core of tough copper alloy and a toothed surface sintered thereto, said surface being formed of a compact bonded mass of copper alloy powders, composed of 0.25 to 10% of a base-forming element selected from the group consisting of chromium, cobalt and nickel and 0.05 to 5% of an acid-forming element selected from the group consisting of silicon and beryllium, balance substantially all copper, at least part of said base-forming and acid-forming elements being combined to form intermetallic compounds, and a lubricant interspersed with said bonded powders.

FRANZ R. HENSEL.
EARL I. LARSEN.